Jan. 26, 1937.  C. FONTANA  2,069,007
DEVICE FOR AUTOMATICALLY CHANGING TRANSMISSION RATIO
Filed July 16, 1935   10 Sheets-Sheet 1

Inventor,
C. Fontana
Bascock Downing Seibold
By: Attys.

Jan. 26, 1937.  C. FONTANA  2,069,007

DEVICE FOR AUTOMATICALLY CHANGING TRANSMISSION RATIO

Filed July 16, 1935  10 Sheets-Sheet 2

Inventor:
C. Fontana

By Glascock Downing & Seebold
Attorneys

Jan. 26, 1937.  C. FONTANA  2,069,007
DEVICE FOR AUTOMATICALLY CHANGING TRANSMISSION RATIO
Filed July 16, 1935  10 Sheets-Sheet 9

Inventor:
C. Fontana.
By Glascock Downing & Seebold
Attorneys.

Jan. 26, 1937.  C. FONTANA  2,069,007
DEVICE FOR AUTOMATICALLY CHANGING TRANSMISSION RATIO
Filed July 16, 1935  10 Sheets-Sheet 10

Inventor:
C. Fontana
By Glascock Downing & Seebold
Attorneys

Patented Jan. 26, 1937

2,069,007

UNITED STATES PATENT OFFICE 2,069,007

DEVICE FOR AUTOMATICALLY CHANGING TRANSMISSION RATIO

Cesare Fontana, Genoa, Italy

Application July 16, 1935, Serial No. 31,680
In Italy July 16, 1934

3 Claims. (Cl. 74—393)

The present invention has for its object a mechanical device provided with revolving members and destined to be interposed between a driving shaft and a driven shaft for the purpose of transmitting the motion from the former to the latter with a transmission ratio which, thanks to the construction of the device and the proportioning of the various elements, results automatically in a suitable range and in relation either to the value of the load to be lifted or to that of the torque applied to the driving shaft.

In order to carry into effect the object of the present invention, an element (pin), eccentrically mounted upon the driving shaft, is mechanically connected to the driven member through parts and members which also include at least one resilient element, said parts and members assuming relatively to each other and to the driving and driven members a given mutual position in relation to the applied load; the said resilient element has an influence over the position that is assumed by a slide member or guide, (included amongst the elements interposed between the driving and the driven members), in which the motion of the driving eccentric pin decomposes into two parts, one of rotation and the other of translation; the component of rotation is utilized for the transmission of the motion from the driving element to the driven one, whilst the component of translation is not utilized, the latter component being directly proportional to the useful resistance applied to the device, whereas the component of rotation is indirectly proportional to the value of the resistance applied to the device.

More particularly, the realization foreseen and forming the fundamental part of the present invention, considers an intermediate member which at one side (that is, towards the driven element) is connected with the said driven element through the (indirect) interposition of the resilient element, whilst at the other side it is connected—with suitable ranges of freedom—to the driving member; the resilient element will cause, in relation to the values of the applied load, of the torque, and in relation to the dimensions and the proportions of the various parts, a mutual position—of equilibrium—amongst the different members when the external load is applied and when a determined torque is applied to the driving member; in such conditions the interposed resilient element—which is so arranged and dimensioned as to give a determined maximum deflection—will be submitted to a given deformation which is lower than the maximum one aforesaid. The difference between the maximum deflection that the resilient element may afford and that of equilibrium mentioned above is, according to the foregoing, proportional to the useful component of rotation of the element actuated by the eccentric driving pin. In this manner, in relation to the value of the applied load and to that of the torque, a determined ratio is realized between the rotation of the driving member and the rotation that, in relation to the deformation of the resilient element and therefore to the arrangement taken up by the various elements, the driven member performs for each angle made by the driving member.

From the foregoing it follows that, if the resistant couple applied is so high as not to permit the device to raise the applied load, the intermediate member wherein takes place the decomposition of the motion of the driving pin only performs, substantially, motions of translation and, for each revolution, the spring remains under its maximum load modifying, however, its deformation for each revolution of the driving shaft. Considering the extreme opposite case, there follows that the spring does not result practically deformed and that the motion is transmitted with a ratio of 1:1 from the driving member to the driven one and the intermediate member, wherein occurs the decomposition of the motion of the eccentric driving pin, performs only motions of rotation. For an intermediate case, for which there will be a determined transmission ratio resulting from the foregoing, the element wherein the said decomposition occurs will accomplish a complete travel of translation and between the driving member and the resistant one there will result, for each complete travel of translation of the said element, the running of a rotation. This will take place during a certain number of revolutions of the driving shaft. During the complete translation travel, the resilient element within the device, in addition to the initial load set up by the load to be raised, will be charged progressively and subsequently and progressively it will discharge as far as the initial value.

The accompanying drawings illustrate, only by way of example, either an embodiment of the object of the invention or, separately, the various most important constitutive elements or, finally, the subsequent positions of the various members for an extreme case and for an intermediate case.

More particularly, Fig. 2 is a section thereof (II—II of Fig. 1); the said Figures 1 and 2 consider the device in rest position, or the case wherein the couple applied is the minimum.

Fig. 1, are made with the same principle thereof, that is to say, they are a section made with a plane I—I of Fig. 2.

Figure 3:
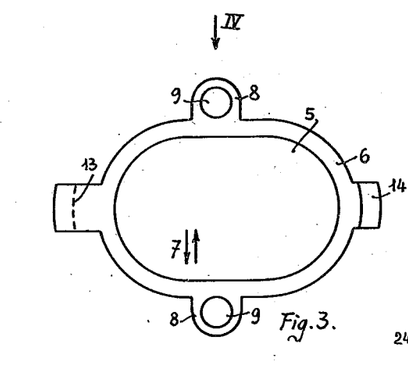
Figures 3 and 4 represent in view (arrow III) and in plan (arrow IV) respectively the member which, according to the values of the driving and resistant loads, decomposes the driving motion into two portions, the useful portion, of rotation, and the non-utilized portion, of translation.
Figure 4:
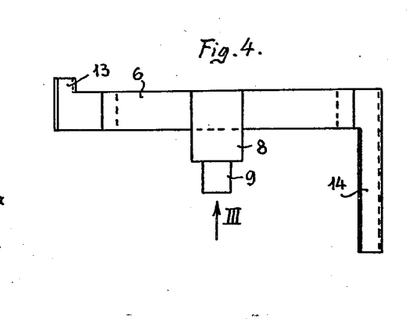

Referring more particularly to the Figures 1 to 8, I are the fixed supports of the device; 2 is the driving shaft provided with an eccentric pin 3; such pin is housed, through the interposition of a ball bearing 4, within the elongated chamber 5 of a decomposition member 6 (Figures 3 and 4). The said eccentric pin performs a revolution for each revolution of the driving shaft and the member 6, according to the values of the loads, may perform only rotations equal to that of the pin 3, or only alternate translations in the direction of the arrows 7 (Fig. 3), or alternate translations in the direction of the arrows 7 simultaneously to rotations following the pin 3, an internal to-and-fro motion of the member 6 in the direction of the arrows 7 corresponding to a given number of rotations of the pin 3 and to another number of revolutions of the driven member (as hereinafter indicated); the ratio between the said numbers of revolutions corresponding to the transmission ratio between the driving member and the driven one. The member 6 presents, protruding from one of its sides, the parts 8 which terminate with the pins 9 destined to be housed, through the provision of the ball bearings 10, within the chambers 11 of a part 12 of an element which will be mentioned hereinafter (Figures 7 and 8); the member 6, Figs. 3, 4 also presents, protruding from the two opposed sides, two projections 13 and 14 each of which is designed to act upon one end of the springs 15 and 16. The casing 17 of the device, to which the load to be raised and in general the external resistance are applied directly or indirectly through the pin 18, includes an element 19 (Figures 5 and 6) which, by means of the balls 20 and of corresponding slots 21, may perform oscillations of rotation relatively to the casing 17. The said element 19 is substantially constituted by a plate 22 and is provided with projections 23 and 24 each of which is designed to act upon the other end of the springs 15 and 16; these springs are each constituted by a certain number of helicoidal turns and each of them terminates in two extensions that are substantially directed towards the centre of the device and that are parallel with each other; 25 and 26 denote the extensions of the spring 16, and 27 and 28 those of the spring 15; from Fig. 1 it will be seen that the elements 13 and 24 are included between the projections 25 and 28 of the spring 15, and that the elements 14 and 23 are included between the projections 25 and 26 of the spring 16. To obtain this, it is necessary that the projection 14 should pass through the plate 22, which occurs by means of the aperture 29; the plate 22 is also formed with the apertures 30 and 31 designed to permit the passage of the parts 8 and 9 of the member 6 so that they may operate, as already said, within the chamber 11 of the element 12. The element 19 also presents a central pin 32 carrying, with the plate 33, an eccentric pin 34 which, with the interposition of a ball bearing 35, is housed exactly within the notch 36 of the said element 12; such notch 36 constitutes the hub 37 of a toothed sector 38 which is integral with the said element 12.

Figures 5, 6, 7, 8:
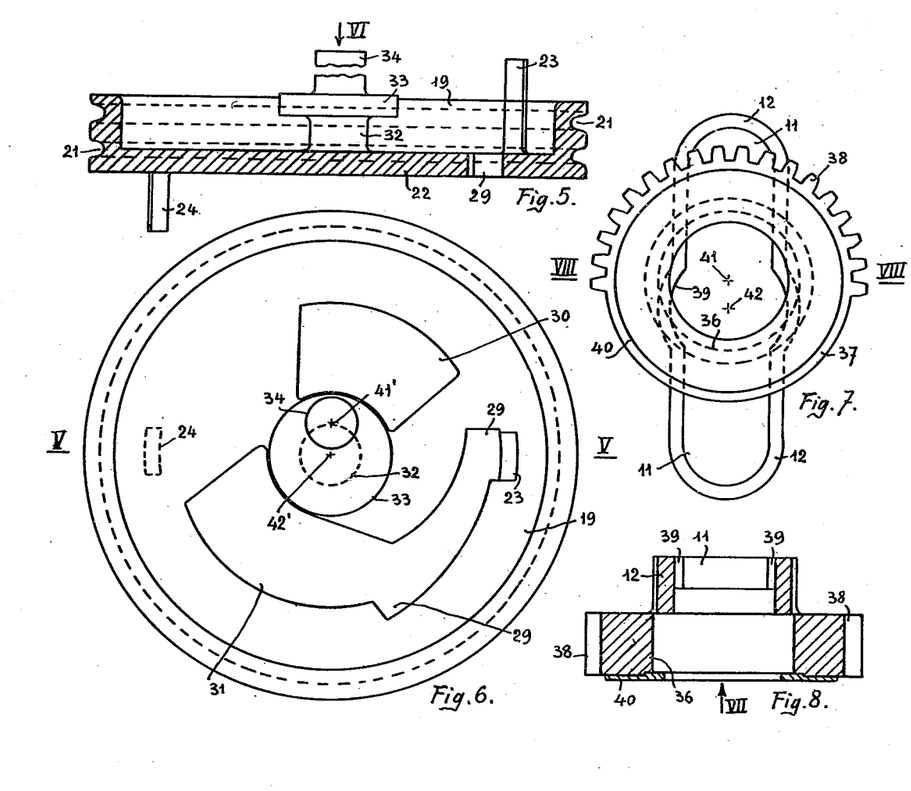
Figures 5 and 6 show in axial section (V—V Fig. 6) and in side view (arrow VI Fig. 5) respectively an intermediate member actuated by the preceding one and acting upon one end of the springs (upon the other end of which acts the member represented by the Figures 3 and 4) and also acting upon another successive member in engagement with the driven element.
Figures 7 and 8 show the said subsequent intermediate member respectively in side view (arrow VI of Fig. 8) and in transverse section (VIII—VII of Fig. 7).

Referring more particularly to the Figures 7 and 8 it will be seen that the element 12 includes the elongated chambers 11 for the movement of the pins 9 and their bearings 10, the circular chamber of larger dimensions 39 for the passage of the plate 33, the hub 37 of the sector 38; a small cover 40 serves for the closure and the tightness, thanks to the provision of devices not shown, of the ball bearing 36.

The toothed sector 38 with center at 41, is eccentric relatively to the seat 39 with center at 42, see Fig. 7. The centers 41 and 42 correspond to the axes 41' and 42' of the elements 34 and 33 respectively (Figures 3 and 6).

The casing 17 of the apparatus presents, upon a projection 43, a toothed sector 44 wherewith engages the toothed sector 38. Such casing is provided with a cover 45 and is sustained by the bearings 1 with the balls 46.

The operation of the device is the following:—

First of all it will be said that the springs 15 and 16 are so proportioned as to give a maximum deformation coresponding to the maximum useful load applied which has to be overcome; it will also be possible, however, to apply to the device a resistant load even greater than the maximum load to overcome.

In order to explain the operation of the device it will be convenient to consider four different values of the applied load—apart from the torque—and more particularly:—

(a) minimum resistant load applied;

(b) applied load intermediate between a minimum value and a maximum value of the load for which the device is still giving a transmission of motion;

(c) extremely maximum applied load, such that the device is no longer giving a transmission of motion;

(d) applied load the value of which is higher than the maximum load as per letter (c).

For the subsequent description, it will be convenient to illustrate the operation of the above cases, but with an order different from that previously indicated.

*Operation for the case a*

Figure 1:
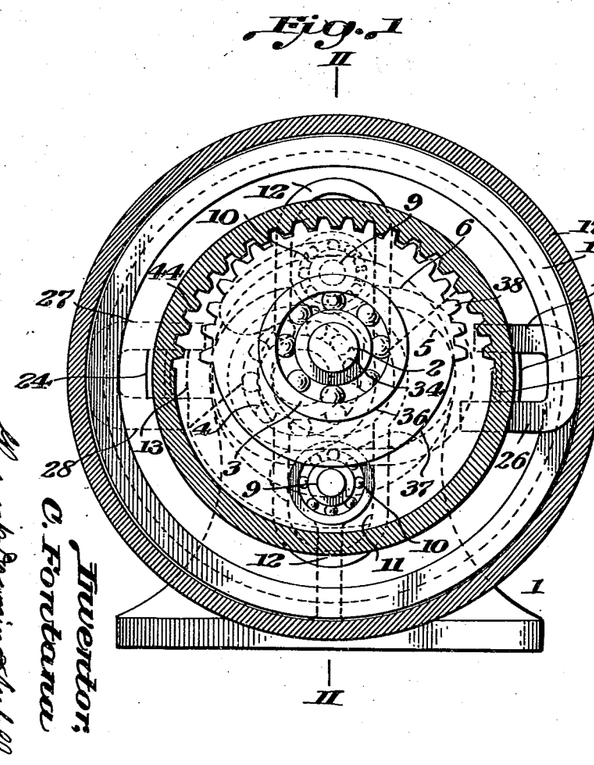
Fig. 1 is a transverse section (I—I of Fig. 2) of the device.
Figure 2:
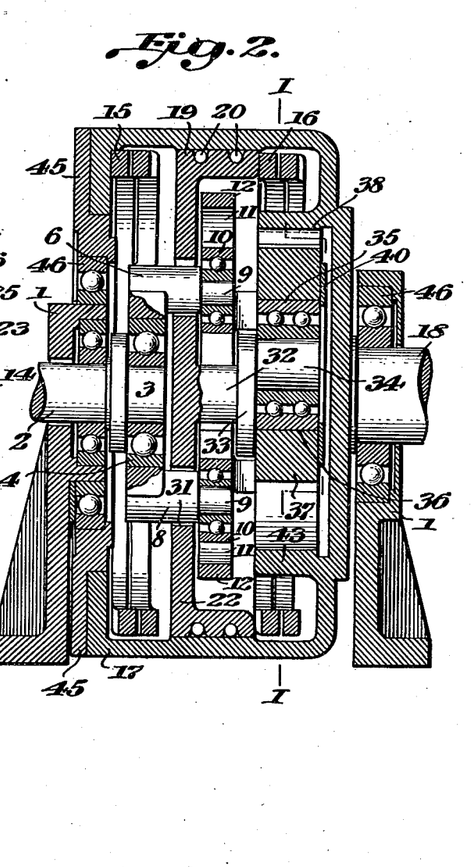

In this assumption, the various parts do not perform substantial reciprocating motions and the driven member 17 and 18 follows the driving member 2 with the same number of revolutions;

it may be imagined—with reference to Fig. 1—that all the parts contained herein, except for the bearings 1, revolve such as they are.

*Operation for the case c*

Let us assume that the applied load be so strong to permit very scarcely a transmission of motion from the member 2 to the member 17, 18; let us also assume to increase a very little further the applied load so that the element 17, 18 does not revolve any longer; that is to say, to arrive at the limit case for which the transmission ratio is zero. In this case the positions of the various members as illustrated in Figures 9 to 16 occur subsequently.

In the said Figures 9 to 16, it has been indicated, for the sake of simplicity, only the positions of the driving shaft 2 (which lies always at the center of the figures), the subsequent positions assumed by the eccentric pin 3 for each eighth part of a revolution, and the deformations of the springs; each figure also shows the positions of the parts 12, 13, 14, 6, 23, 24, 25, 26, 27, 28, 38 and 44.

From the Figures 9 to 16 it is seen that when—owing to the said conditions of load—the transmission ratio of the device is zero, the eccentric pin 3 causes, during one of its rotations, to the member 6 only motions of oscillation in the direction of the arrows 7—after having stretched the springs through the projections 13, 24 and 14, 23. In the first place the rotation of the eccentric pin 3 sets up an angular displacement in the direction of the arrow 47 of the toothed pinion 38 around the axis 41 so that the said pinion engages with the tooth gearing 44 thus assuming the position shown in Fig. 9, whereby also the projections 13 and 14 will have performed a slight angular rotation 48 (Fig. 9); in its turn, the eccentric pin 34, which for the motion of the element 12 has shifted in an opposite direction from that of the arrow 47, has accomplished an angular displacement 49, also this in opposite direction from that of the arrow 47; consequently, the springs attain their highest deformation, the reaction to the rotation of the toothed pinion 38 around the axis 41 also attains its maximum value and the same is by the torque urging the member 17, 18 with which the said pinion 38 is in engagement. The subsequent rotations (shown) of an eighth part of revolution of the eccentric pin 3 do not modify any longer the relative position between the pinions 38 and 44 if the speed of the eccentric pin 3 is sufficiently high, but they only cause the displacements of the element 6 in the direction of the arrow 7, the sliding of the pins 9, together with their bearings 10, within the recesses 11 of the element 12 that is stationary within the device and that of the projection 13—14, which alter the tension of either one or the other of the springs thus increasing the deformation of one of such springs and restoring the other to the normal condition alternately, as it will be seen from the Figures 9 to 16, which sets up the maximum torque with which the member 17—18 is urged, the spring being already in its highest deformation. Consequently, the motion of the pin 3 is not utilized for overcoming the applied load.

In the above assumption, the transmission ratio is zero.

*Operation for the case b*

Figure 9:
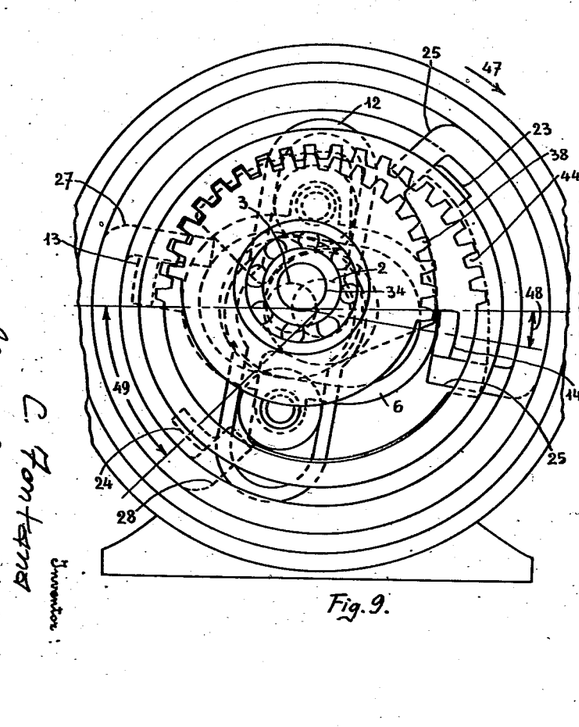
Figures 9 to 16 show eight subsequent positions of the various members for the case where the driven member is locked and the driving one performs a complete revolution; these figures, which correspond to the above
Figure 10:
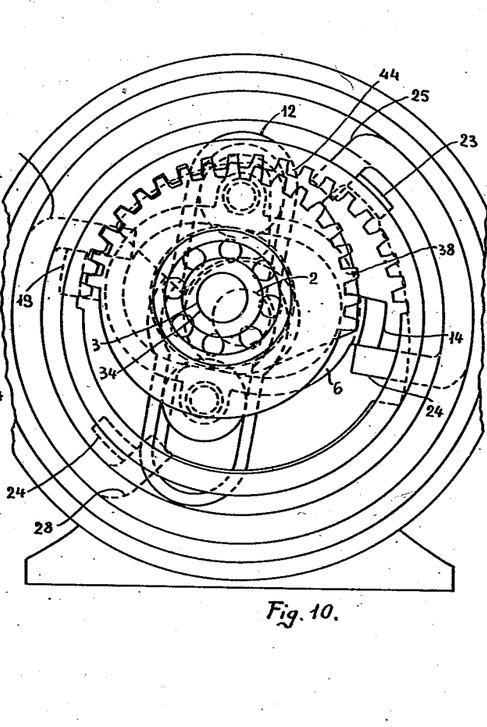
Figure 11:
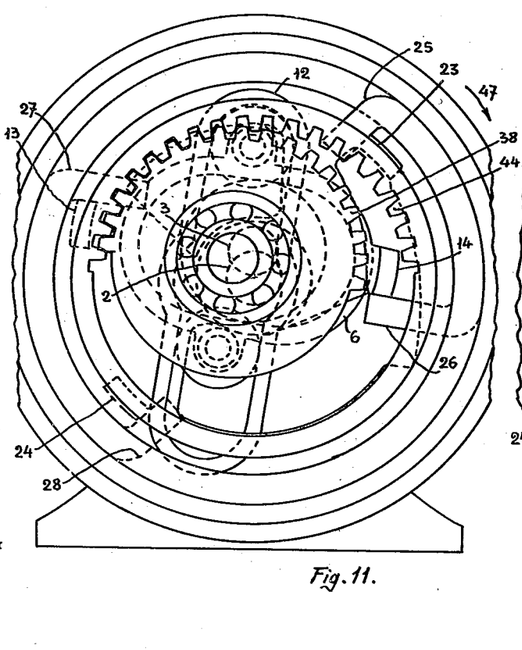
Figure 12:
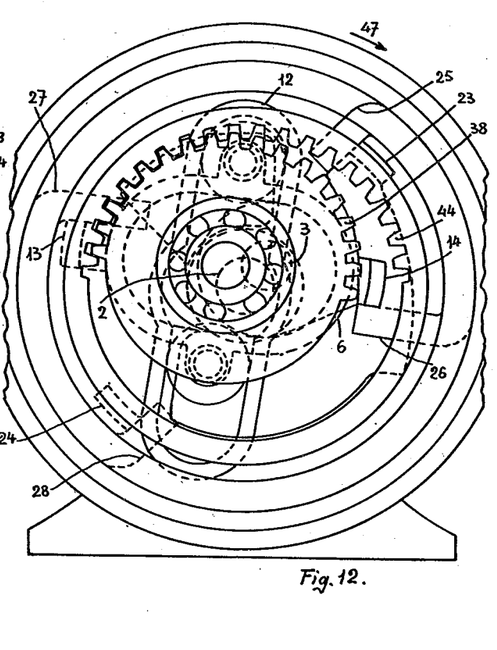
Figure 13:
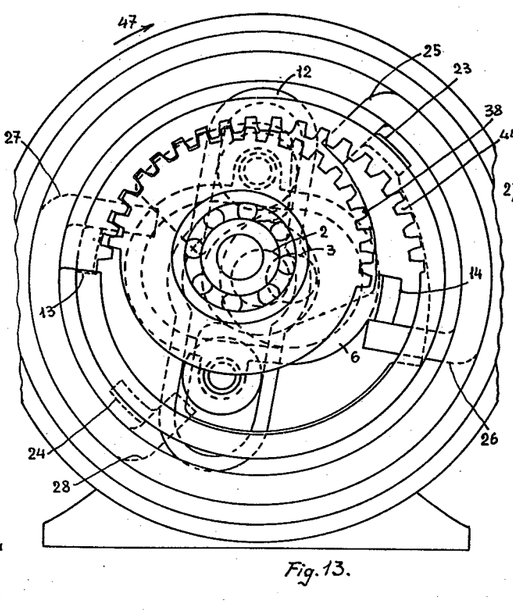
Figure 14:
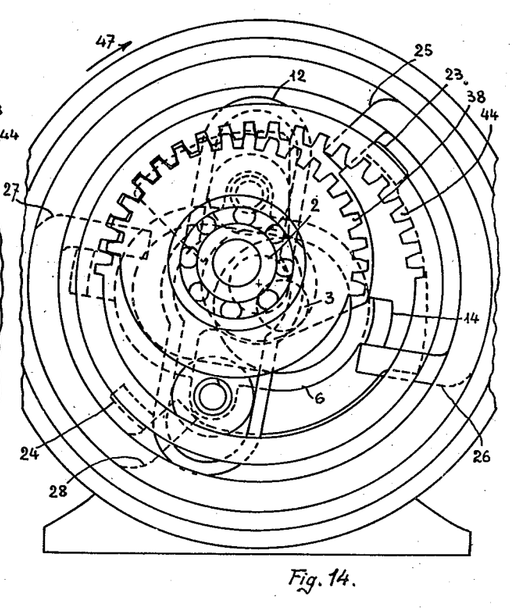
Figure 15:
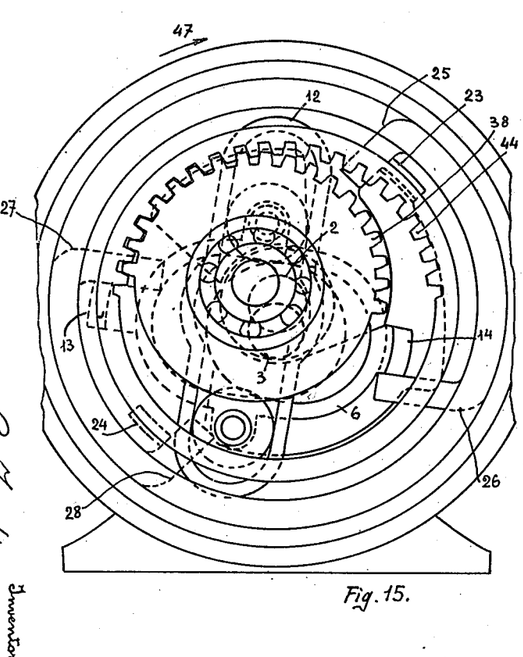
Figure 16:
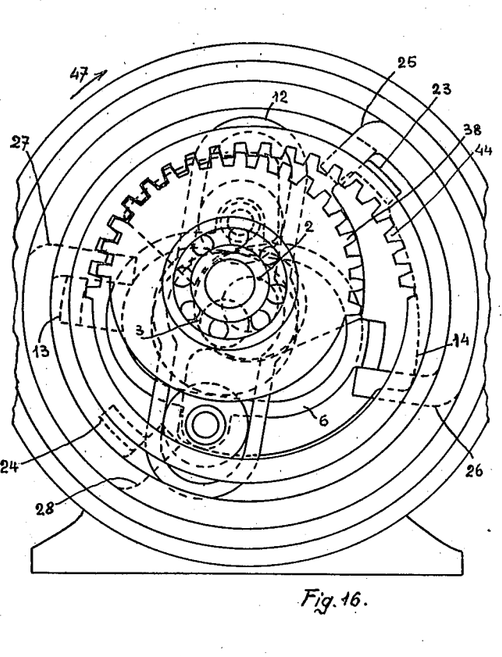
Figure 17:
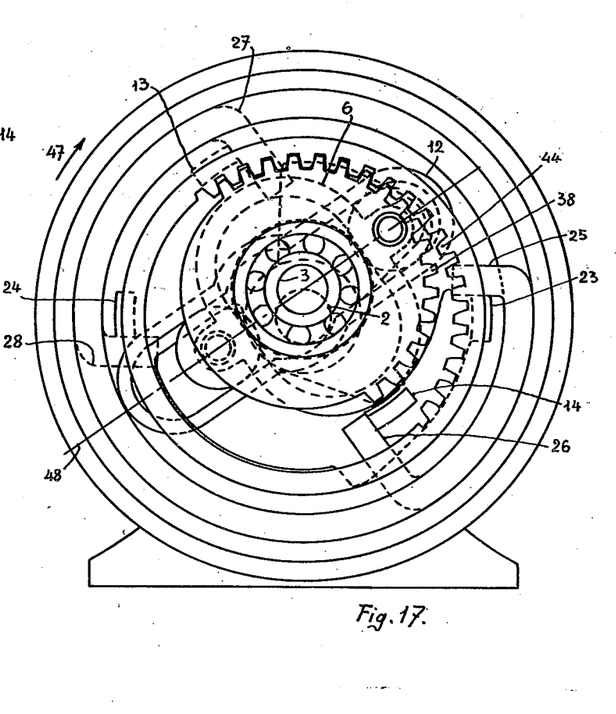
Figures 17 to 23 show, likewise Figures 9 to 16, the disposition that the various elements subsequently assume for an intermediate range of the transmission ratio.
Figure 18:
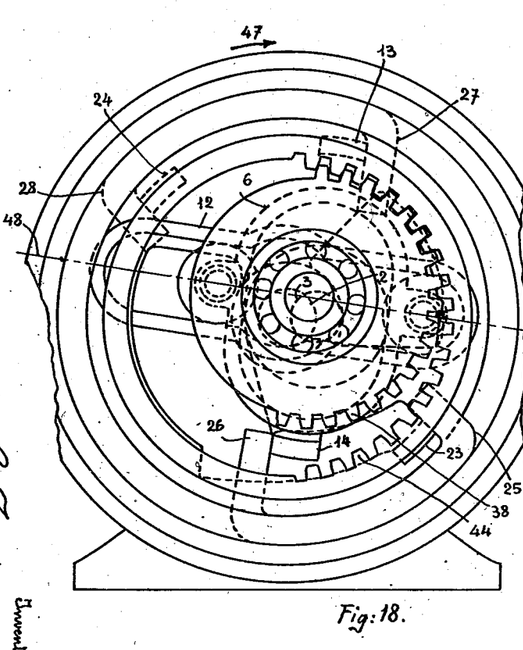
Figure 19:
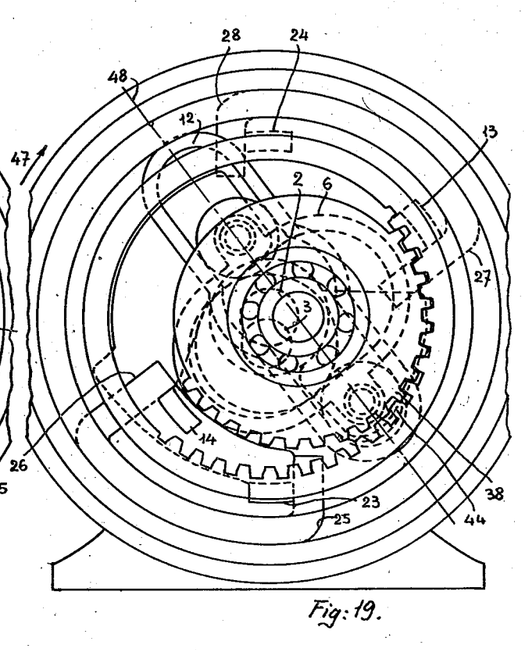
Figure 20:
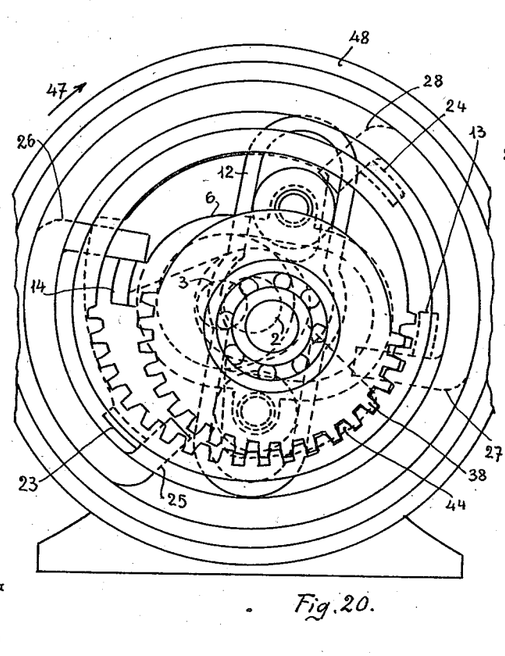
Figure 21:
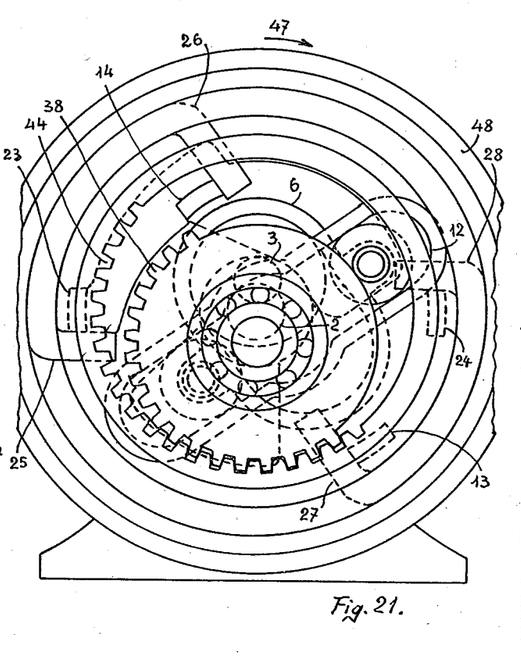
Figure 22:
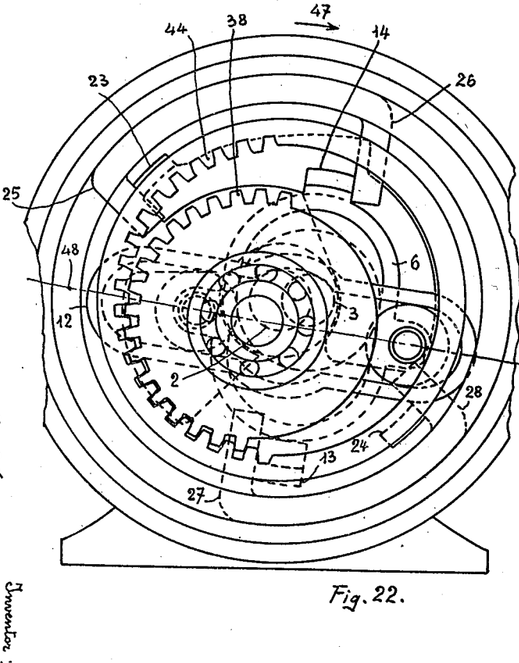
Figure 23:
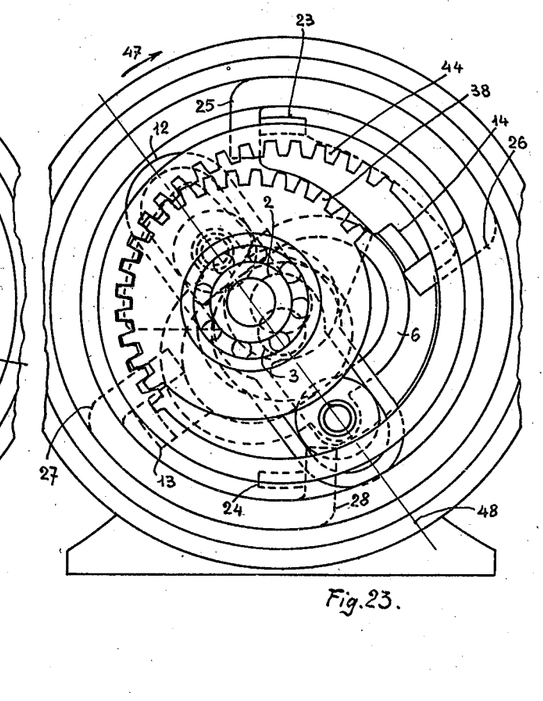

In the description of the operation relating to the case (*a*) the transmission ratio was one; in that of the operation relating to the Figures 9 and 16, the transmission ratio was zero; in the first case the applied load was minimum, whilst in the second case it had a determined value; the whole for a constant torque.

Now, if, leaving the value of the torque unaltered, a value of the applied load, intermediate between that considered for the case (*a*) and the end one considered for the case (*c*) is considered, then the transmission ratio will assume a value intermediate between the two transmission ratios previously obtained. Figures 17 to 23 show the operation of the device for the particular case where the applied load is such as to secure, always with the same torque as that previously considered, a transmission ratio that is intermediate; in fact, in Figures 17 to 23, the eccentric pin 3 has performed a complete revolution whereas the casing 17 has performed a fraction of revolution; in order to render the above materially visible, the subsequent positions assumed by a point 48 of the casing have been considered and represented in the figures. Also in Figures 17 to 23 the subsequent position assumed by the elements 2, 3, 6, 12, 13, 14, 23, 24, 25, 26, 27, 28, 38 and 44 have been indicated. From the Figures 17 to 23 it will be seen that the difference between the torque applied and the couple generated by the applied moment of resistance causes, initially, a rotation of the pinion 38 in the direction of the arrow 47 around its axis 41, so that the sector 38 runs upon the sector 44, as shown by the figure. The eccentric pin 3 causes a partial displacement of the element 6 in the direction of one of the arrows 7 and consequently the projections 9 give the element 12 and therefore the sector 38 the said motion relatively to the casing 17, and the springs deform accordingly in relation to the load applied upon the member 17—18. The subsequent rotations of the pin 3 (rotations that in Figures 17 to 23 are—unlike that illustrated in the Figures 9 to 16—of 90° relatively to each other) cause either the displacement of the element 6 in the direction of the arrows 7 alternating the initial tension of the wheel (which corresponds to a loss of revolutions between the driving shaft and the driven one), or the drawing in rotation according to the arrow 47 of the member 6, the said motion of rotation being utilized for starting the rotation of the casing 17. It will thus be seen that, by means of the device according to the application, the motion of the pin 3 is decomposed within the member 6 into two parts, one of translation in the direction of the arrows 7, and one of rotation in the direction of the arrows 47, the former being the greater, the greater is the difference between the torque and the couple generated by the external load to be overcome, the second being the lesser, the greater is the difference between the torque and the couple caused by the external load to be overcome. The manner in which the motion of rotation 3 decomposes into the motion of oscillation 4 and into the motion of rotation of the members in the direction of the arrow 47 depends upon the ratio between the driving moment and the resistant moment applied and therefore, as previously indicated, upon the amplitude of the rolling of the sector 38 upon the sector 44, upon the variation of the deformation of the spring urging the member 6 for each cycle of translation and variation which, according to the rolling of the sector 38, proportional to the load, will take place either with a spring initially already highly stretched or with a spring initially little deformed, minimum load, maximum speed.

In the case of a transmission ratio included between zero and one, the translation cycles, that is to say, the alternate increase of the deformation of either one or the other spring that is caused by the translation motion of the member 6, are equal to the difference between the revolutions of the driving shaft 2 and that of the mass 17; thus, for instance, if the driving shaft performs ten revolutions and the casing seven revolutions, the translation cycles are three, and consequently the springs 15 and 16 are for three times alternately stressed to deform for a value that is greater than that was caused to them by the load to be raised.

If the initial deformation of the springs, deformation caused by the moment of resistance, is maximum the stress for the increase in the deformation of the same is greater, but in the case (c) is rendered nearly entirely by the return of the springs to the normal deformation when the driving shaft turns almost idly.

In the case where the initial deformation of the springs is minimum, also the stress for the variation of the deformation occurring with nearly unloaded spring, is minimum; in the intermediate cases, it is in relation to the load.

*Operation relating to the case (d)*

There is still to consider the operation relating to the case (d); in this case the applied load lowers (or the casing 17 revolves in an opposite direction from that of the arrow 17) with a motion the acceleration of which is proportional to the difference between the applied driving moment and the applied resistant moment and with an operation opposite to that illustrated in the Figures 17 to 23, that is to say, the various parts will subsequently assume the positions indicated in the Figures 23, 22, 21, 20, ... 17, 23, 22, 21, etc.

Though for descriptive reasons the present invention has been based upon the foregoing specification and the accompanying drawings, yet many practical modifications may be made in the realization of the invention, all of them being however based upon the fundamental principles of the invention as set forth in the following claims.

Having now particularly described and ascertained the nature of the present invention and the manner in which it is to be performed, what is claimed is:—

1. In a mechanical device with revolving members for the transmission of motion with an automatically variable transmission ratio, the combination of a driving shaft, a driven shaft, an element eccentrically mounted upon said driving shaft, organs for the mechanical connection of said element to the driving shaft, a slide member, one of said connecting organs being resilient and mechanically connected to said slide member interposed between the driving and the driven members, other means through which the said resilient organ exerts influence upon the position assumed by the said slide member in which the motion of the said eccentric element decomposes into two parts, one of rotation and the other of alternate translation, other means through which one of the components of rotation is utilized for the transmission of the motion from the driving member to the driven member, said component being indirectly proportional to the value of the resistance applied to the device, while the component of translation, which is directly proportional to the useful resistance applied to the device, is not utilized, the further combination with elements connecting through the intermediate slide member with the driven member, in cooperation with said resilient organ, means connecting the intermediate slide to the driving member, these connecting elements permitting suitable degree of freedom.

2. In a mechanical device provided with revolving members for the transmission of the motion with automatically variable transmission ratio, the combination with a driving shaft and a driven shaft, of a member having an eccentric pin mounted upon and set into rotation by the driving shaft, resilient elements, a guide member provided with a chamber within which the said eccentric pin is housed, said guide member being adapted to effect the decomposition of the motion of the driving member into an alternate translation motion and into a motion of rotation, and being provided with two projections each of which is adapted to actuate one of the resilient elements, and with two other projections each of which is adapted to be housed within an element provided with guides and in mesh with the casing whereto the moment of resistance is applied, while it is simultaneously under the action of the member fitted with an eccentric pin, the said member being also provided with projections upon which the resilient elements react; the said last element being so arranged and applied as to remain centered relatively to the external casing.

3. In a mechanical device with revolving means for the transmission of motion with automatically variable transmission ratio, the combination of a driving shaft, a driven shaft, a housing, an internally toothed crown, an eccentric pin mounted on the driving shaft, a slide member mounted on and driven by the eccentric pin, said slide member accomplishing only reciprocating vertical movements and being provided with an elongated opening of such dimension as to allow in every case the movements of the pin, said slide member being provided with parallel and equally directed projections and with parallel and oppositely directed projections, a second slide member the direction of which is under fixed angular position in respect to the first named slide member, said first slide member being provided with a longitudinal opening in which said first projections engage a toothed sector, the opening of said second slide member having such dimensions as to permit the movements of the first slide member and of its equally directed projections, the toothed sector being connected with said first slide member meshing with said internally toothed crown which is concentric and integral with the housing carrying the driven shaft, said housing being mounted for free rotation, a plate provided with openings and with an eccentric pin on which said toothed sector is mounted to freely rotate, said plate being also provided with diametrically situated and oppositely directed projections, a pair of springs each provided with charging arms, one of the first-named projections of the slide member and the projection of said plate being adapted for charging said first spring through its charging arms and one of the opposite projections of the slide member and of said plate adapted for charging the other spring through its charging arms.

CESARE FONTANA.